United States Patent
Iwase

(10) Patent No.: US 11,140,833 B2
(45) Date of Patent: Oct. 12, 2021

(54) ELECTRIC POWER TOOL

(71) Applicant: MAKITA CORPORATION, Anjo (JP)

(72) Inventor: Masayuki Iwase, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 16/266,290

(22) Filed: Feb. 4, 2019

(65) Prior Publication Data

US 2019/0239445 A1 Aug. 8, 2019

(30) Foreign Application Priority Data

Feb. 5, 2018 (JP) .............................. JP2018-018546

(51) Int. Cl.
*A01G 3/053* (2006.01)
*A01G 3/047* (2006.01)
*A01G 3/04* (2006.01)

(52) U.S. Cl.
CPC ........... *A01G 3/053* (2013.01); *A01G 3/0475* (2013.01); *A01G 2003/0461* (2013.01)

(58) Field of Classification Search
CPC ............. A01G 3/04–0535; H01H 9/00; H01H 9/22–24
See application file for complete search history.

(56) References Cited

U.S. PATENT DOCUMENTS

| 2003/0089575 A1* | 5/2003 | Jong ........................ B27B 17/08 192/131 R |
| 2005/0115340 A1* | 6/2005 | Sasaki ..................... A01G 3/053 74/25 |
| 2008/0115371 A1* | 5/2008 | Allen ........................ B27B 9/02 30/517 |
| 2012/0048584 A1 | 3/2012 | Sato |
| 2012/0317821 A1 | 12/2012 | Tsuchiya et al. |

(Continued)

FOREIGN PATENT DOCUMENTS

| CN | 205491856 U | 8/2016 |
| JP | 2011-173219 A | 9/2011 |

(Continued)

OTHER PUBLICATIONS

Notice of Reasons for Refusal dated Jul. 6, 2021 from the Japanese Patent Office in JP Application No. 2018-018546.

*Primary Examiner* — Kenneth E Peterson
(74) *Attorney, Agent, or Firm* — Sughrue Mion, PLLC

(57) ABSTRACT

A drive manipulation member is configured to be allowed to move to a drive position when an interlock member is at a first position and to be prohibited from moving to the drive position when the interlock member is at a second position. The drive manipulation member is supported rotatably about an axis with respect to the second housing, and is provided with first and second portions extending from the axis in different directions. The first portion is configured to be manipulated by the user. The second portion is provided with a switch operation portion configured to operate a switching unit and an interlock engaging portion configured to engage with or contact with the interlock member. The switch operation portion and the interlock engaging portion are located at different positions from each other in a direction parallel to the axis.

12 Claims, 6 Drawing Sheets

(56) References Cited

U.S. PATENT DOCUMENTS

2013/0160304 A1* 6/2013 Tate .................... B25F 5/02
                                                                                      30/381
2017/0071134 A1* 3/2017 Li ...................... A01G 3/053

FOREIGN PATENT DOCUMENTS

| JP | 2012-44882 A | 3/2012 |
| WO | 2011/105232 A1 | 9/2011 |

* cited by examiner

ELECTRIC POWER TOOL

CROSS-REFERENCE

This application claims priority to Japanese Patent Application No. 2018-018546, filed on Feb. 5, 2018, the entire contents of which are incorporated herein by reference.

TECHNICAL FIELD

The disclosure herein relates to an electric power tool, such as a hedge trimmer used mainly to trim hedges and plants.

TECHNICAL FIELD

Japanese Patent Application Publication No. 2011-173219 describes a hedge trimmer. This hedge trimmer includes a first housing configured to be attached to a pair of shear blades, and a second housing rotatably connected to the first housing and provided with a handle configured to be gripped by a user. According to such a configuration, the user can control orientation of the pair of shear blades, for example, in accordance with surfaces (e.g., an upper surface and a side surface) of a hedge to be trimmed.

The above hedge trimmer further includes a drive manipulation member, a lock manipulation member and an interlock member. The drive manipulation member is configured to be manipulated by the user between a stop position and a drive position to drive and stop the pair of shear blades. The lock manipulation member is configured to be manipulated by the user between a lock position and an unlock position to allow and prohibit rotation of the second housing with respect to the first housing. The interlock member is coupled to the lock manipulation member and is configured to move between a first position and a second position in conjunction with movement of the lock manipulation member.

The interlock member constitutes an interlock mechanism configured to prohibit both the drive manipulation mechanism and the lock manipulation mechanism from being manipulated simultaneously. That is, the drive manipulation member is allowed to move to the drive position when the interlock member is at the first position, whereas the drive manipulation member is prohibited from moving to the drive position when the interlock member is at the second position. Due to this, when the lock manipulation member is manipulated to be at the unlock position, the pair of shear blades is prohibited from being driven. Further, the interlock member is allowed to move to the second position when the drive manipulation member is at the stop position, whereas the interlock member is prohibited from moving to the second position when the drive manipulation member is at the drive position. Due to this, when the drive manipulation member is manipulated to be at the drive position, the rotation of the second housing with respect to the first housing is prohibited.

SUMMARY

Downsizing for handheld-type electric power tools, not only for hedge trimmers, is being desired. The disclosure herein provides a technique capable of downsizing the above interlock mechanism. This technique can thus downsize a hedge trimmer or another electric power tool that employs an interlock mechanism of the same type.

An electric power tool disclosed herein may comprise a first housing configured to be attached to a tool; a second housing rotatably connected to the first housing and comprising a handle configured to be gripped by a user; a drive manipulation member provided on the second housing and configured to be manipulated by the user between a stop position and a drive position, wherein the tool is not allowed to be driven when the drive manipulation member is at the stop position, and the tool is allowed to be driven when the drive manipulation member is at the drive position; a switching unit configured to be operated by the drive manipulation member within the second housing; a lock manipulation member provided on the second housing and configured to be manipulated by the user between a lock position and an unlock position, wherein rotation of the second housing with respect to the first housing is prohibited when the lock manipulation member is at the lock position, and the rotation of the second housing with respect to the first housing is allowed when the lock manipulation member is at the unlock position; and an interlock member coupled to the lock manipulation member, configured to move to a first position when the lock manipulation member moves to the lock position and configured to move to a second position when the lock manipulation member moves to the unlock position. The drive manipulation member may be configured to be allowed to move to the drive position when the interlock member is at the first position and may be configured to be prohibited from moving to the drive position when the interlock member is at the second position. The interlock member may be configured to be allowed to move to the second position when the drive manipulation member is at the stop position and may be configured to be prohibited from moving to the second position when the drive manipulation member is at the drive position.

The drive manipulation member may be supported rotatably about an axis with respect to the second housing, and may comprise a first portion extending from the axis in one direction and a second portion extending from the axis in another direction. The first portion may be exposed to outside of the second housing and may be configured to be manipulated by the user. The second portion may comprise a switch operation portion configured to operate the switching unit and an interlock engaging portion configured to engage with or contact with the interlock member. The switch operation portion and the interlock engaging portion may be located at different positions from each other in a direction parallel to the axis. According to such a configuration, the second portion of the drive manipulation member can be made relatively small, by which an interlock mechanism including the interlock member can be downsized. Downsizing of the interlock mechanism can achieve downsizing of the electric power tool.

DETAILED DESCRIPTION

Figure 1:
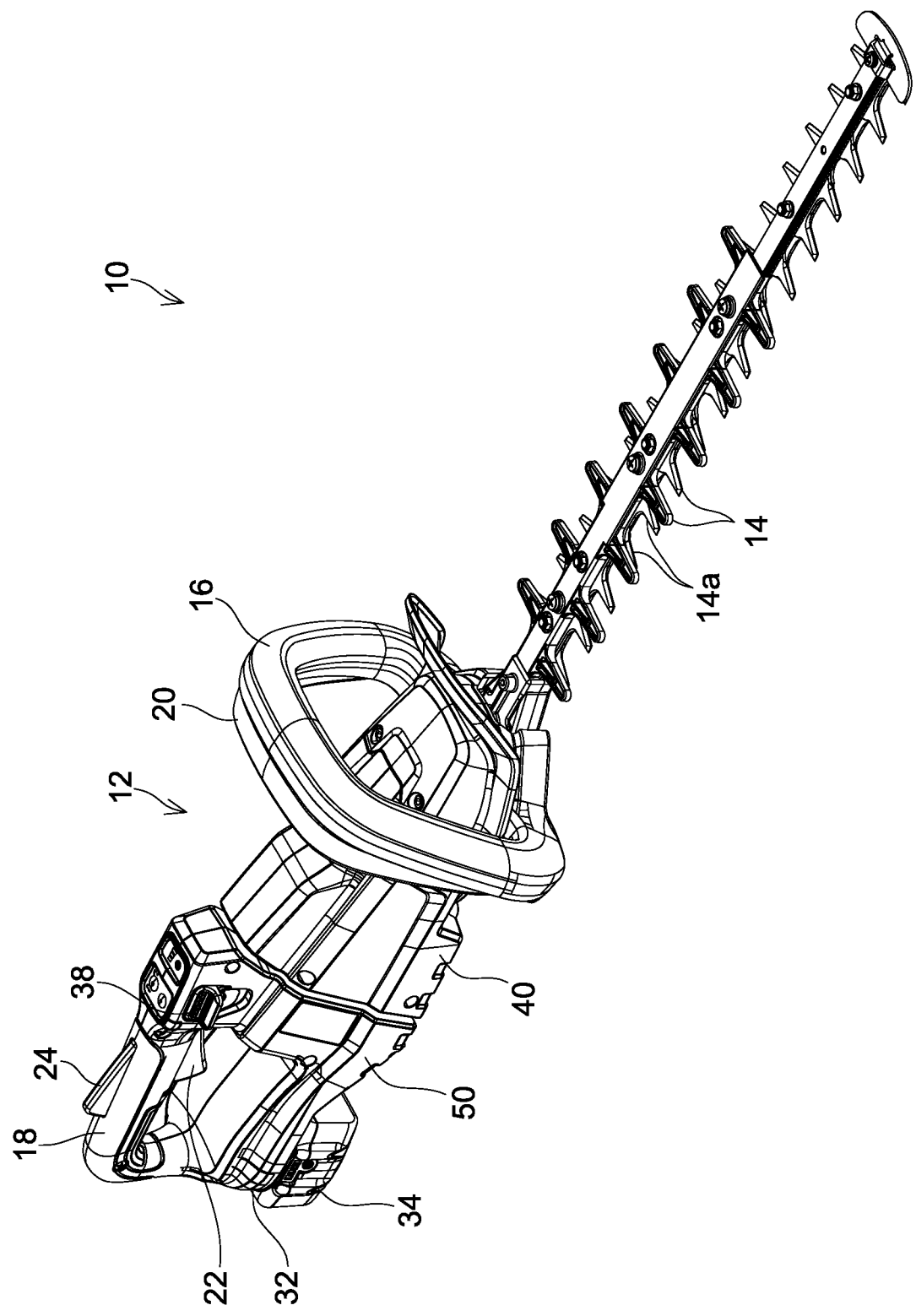
FIG. 1 is a perspective view showing an external appearance of a hedge trimmer 10 of an embodiment.

In an embodiment of the technique disclosed herein, a distance from the axis of the drive manipulation member to the interlock engaging portion may be shorter than a distance from the axis to the switch operation portion. According to such a configuration, an interlock mechanism including the interlock member can be downsized while the distance from the axis of the drive manipulation member to the switch operation portion is made large. When the distance from the axis of the drive manipulation member to the switch operation portion is large, the switch operation portion moves to a relatively large degree as the drive manipulation member rotates. Due to this, an operation amount by which the switching unit is operated by the switch operation portion can be made large.

In an embodiment of the technique disclosed herein, the interlock member may be arranged side by side with the switch operation portion of the drive manipulation member in the direction parallel to the axis of the drive manipulation member. According to such a configuration, the interlock member is disposed near the axis of the drive manipulation member, by which a distance between the drive manipulation member and the lock manipulation member can be made short. Due to this, the electric power tool can be further downsized.

In an embodiment of the technique disclosed herein, the interlock member may be configured to become close to the drive manipulation member by moving to the second position and may be configured to become apart from the drive manipulation member by moving to the first position. However, no particular limitation is placed on how the interlock member moves, and it can be designed variously.

In an embodiment of the technique disclosed herein, directions along which the lock manipulation member moves between the lock position and the unlock position may be different from directions along which the interlock member moves between the first position and the second position. However, in another embodiment, the directions along which the lock manipulation member moves may be same as the directions along which the interlock member moves. In this case, these members may be configured integrally to be a single member, or they may be fixed to each other.

In an embodiment of the technique disclosed herein, the lock manipulation member may be located between the handle and the first housing. According to such a configuration, a user can easily manipulate the lock manipulation member while gripping the handle.

In an embodiment of the technique disclosed herein, the tool may be a pair of shear blades. In this case, the electric power tool may be a hedge trimmer or another trimmer for gardening.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved electric power tools, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 2:
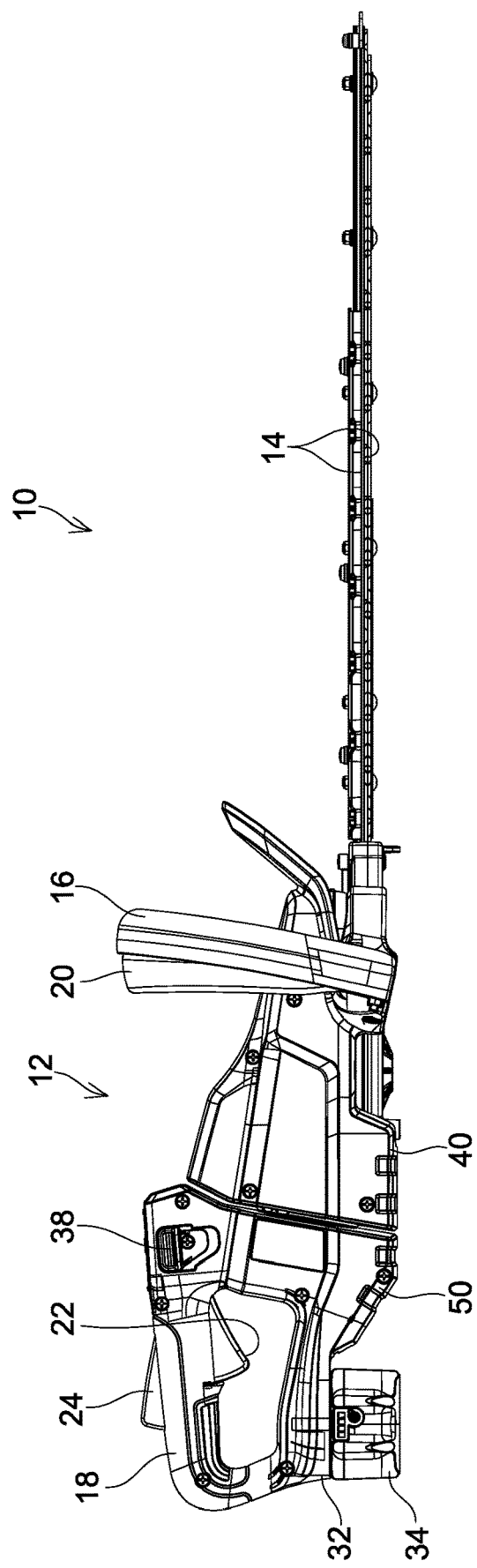
FIG. 2 is a side view showing the external appearance of the hedge trimmer 10 of the embodiment.

With reference to the drawings, a hedge trimmer 10 of an embodiment will be described. The hedge trimmer 10 is a gardening tool used mainly to trim hedges and plants. As shown in FIGS. 1 and 2, the hedge trimmer 10 comprises a housing 12 and a pair of shear blades 14 extending from the housing 12. The housing 12 comprises a first housing 40 and a second housing 50. The first housing 40 is attached to the pair of shear blades 14. The second housing 50 is rotatably connected to the first housing 40.

The pair of shear blades 14 linearly extends forward (toward right in FIG. 2) from the first housing 40 and includes a plurality of cutting edges 14a along its longitudinal direction. The shear blades 14 are configured to be reciprocated to each other to trim hedges and plants by the plurality of cutting edges 14a. In the hedge trimmer 10 of the present embodiment, both of the shear blades 14 in the pair are configured to be reciprocated. However, in another embodiment, only one of the shear blades 14 in the pair may be configured to be reciprocated.

The housing 12 comprises a front handle 16 and a rear handle 18. The front handle 16 is provided at the first housing 40, and the rear handle 18 is provided at the second housing 50. The front handle 16 and the rear handle 18 are configured to be gripped by a user. The hedge trimmer 10 is a handheld-type electric power tool, and the user usually grips the front handle 16 with his/her left hand and grips the rear handle 18 with the right hand to operate the hedge trimmer 10. The front handle 16 extends along a plane angled with respect to a front-rear direction, and the rear handle 18 extends along a plane parallel to the front-rear direction, although this is merely an example.

The front handle 16 is provided with an auxiliary drive manipulation member 20, and the rear handle 18 is provided with a drive manipulation member 22. The rear handle 18 is further provided with a release manipulation member 24. The hedge trimmer 10 is configured to drive the pair of shear blades 14 only while both of the auxiliary drive manipulation member 20 and the drive manipulation member 22 are manipulated simultaneously. Further, the drive manipulation member 22 is mechanically locked by the release manipulation member 24 usually, and is configured to be allowed to be manipulated only while the release manipulation member 24 is manipulated. With these configurations, the hedge trimmer 10 is configured to prohibit driving the pair of shear blades 14 unless the user grips both of the front handle 16 and the rear handle 18.

Figure 3:
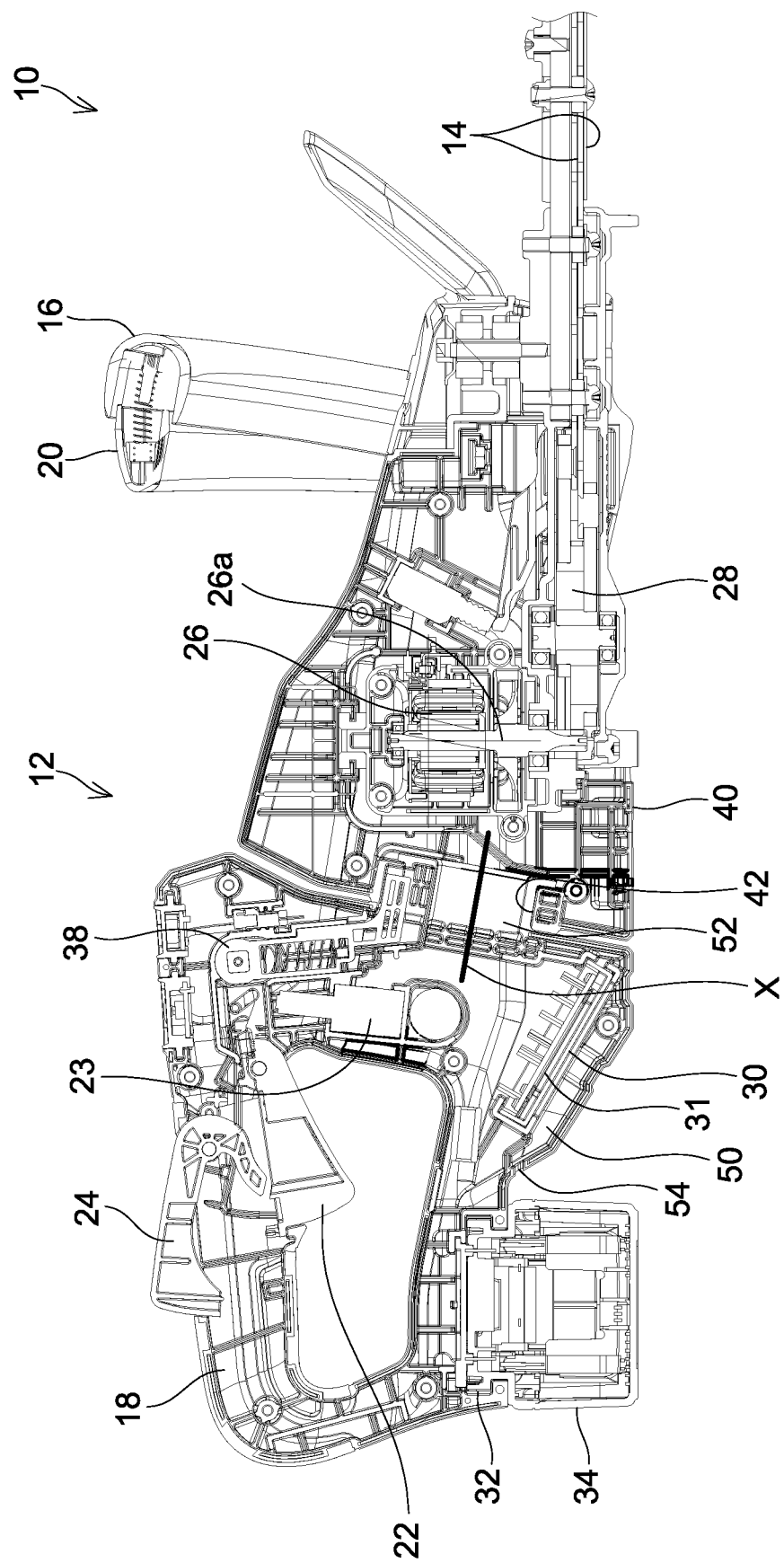
FIG. 3 is a cross-sectional view showing an internal structure of the hedge trimmer 10 of the embodiment.

As shown in FIG. 3, the hedge trimmer 10 further comprise a motor 26. The motor 26 is housed in the first housing 40 and is configured to drive the pair of shear blades 14. In this respect, the motor 26 is connected to the pair of shear blades 14 via a crank cam 28 and is configured to reciprocate both of the shear blades 14 in the pair. In another embodiment, the motor 26 may be configured to reciprocate only one of the shear blades 14 in the pair. The motor 26 of the present embodiment is a brushless motor, although no particular limitation is placed thereto. A rotary shaft of the motor 26 is vertical to the longitudinal direction of the pair of shear blades 14 and extends in an up-down direction.

The hedge trimmer 10 further comprises an electric circuit unit 30 and a battery interface 32. The electric circuit unit 30 is housed in the second housing 50 and is configured to control power supplied to the motor 26. For example, when the user manipulates the auxiliary drive manipulation member 20 and the drive manipulation member 22, the electric circuit unit 30 starts power supply to the motor 26, and when the manipulation of the auxiliary drive manipulation member 20 and the drive manipulation member 22 is released, the electric circuit unit 30 stops the power supply to the motor 26. Further, the electric circuit unit 30 can change a rotation speed of the motor 26 by controlling the power supplied to the motor 26.

The hedge trimmer 10 further comprises a switching unit 23. The switching unit 23 is housed in the second housing 50 and is configured to be operated by the drive manipulation member 22. That is, when the user manipulates the drive manipulation member 22, the switching unit 23 is operated via the drive manipulation member 22. The switching unit 23 is electrically connected to the electric circuit unit 30 and is configured to provide a drive signal to the electric circuit unit 30 in accordance with the operation by the drive manipulation member 22. The switching unit 23 of the present embodiment is configured to change a drive signal to be provided to the electric circuit unit 30 in accordance with an operation amount by the drive manipulation member 22, although no particular limitation is placed thereto. Then, the electric circuit unit 30 controls the power supplied to the motor 26 in accordance with the drive signal from the switching unit 23. Due to this, the rotation speed of the motor 26 is controlled by a manipulation amount of the drive manipulation member 22 by the user.

The battery interface 32 is located at a lower portion of the second housing 50. The battery interface 32 is configured to detachably receive a battery pack 34 and electrically connect the attached battery pack 34 to the electric circuit unit 30. Thereby, power from the battery pack 34 is supplied to the motor 26 via the electric circuit unit 30. Since the motor 26 is a brushless motor in the present embodiment, the electric circuit unit 30 includes an inverter circuit 31. The inverter circuit 31 is provided electrically between the battery interface 32 and the motor 26, and is configured to convert DC power from the battery pack 34 to AC power and supply the converted power to the motor 26.

As described above, the second housing 50 is rotatably connected to the first housing 40. In this respect, as shown in FIG. 3, the second housing 50 is provided with a shaft portion 52 having a tubular shape, and the first housing 40 is provided with a shaft receiving hole 42 into which the shaft portion 52 is inserted. Thereby, the second housing 50 is configured to be rotatable with respect to the first housing 40 about a central axis X of the shaft portion 52, which is a rotary axis of the second housing 50. The central axis X of the shaft portion 52 (i.e., the rotary axis of the second housing 50 with respect to the first housing 40) slightly inclines to the longitudinal direction of the pair of shear blades 14 (i.e., the front-rear direction), although this is merely an example.

The hedge trimmer 10 further comprises a lock manipulation member 38. Usually, the rotation of the second housing 50 with respect to the first housing 40 is prohibited by the lock manipulation member 38. The rotation of the second housing 50 with respect to the first housing 40 is allowed when the user manipulates the lock manipulation member 38, whereas the rotation of the second housing 50 with respect to the first housing 40 is prohibited when the user releases the manipulation of the lock manipulation member 38. By changing angles of the second housing 50 with respect to the first housing 40, the user can control orientation of the pair of shear blades 14, for example, in accordance with surfaces of a hedge to be trimmed. The lock manipulation member 38 is located between the rear handle 18 and the first housing 40. According to such a configuration, the user can easily manipulate the lock manipulation member 38 while gripping the rear handle 18.

Figure 4:
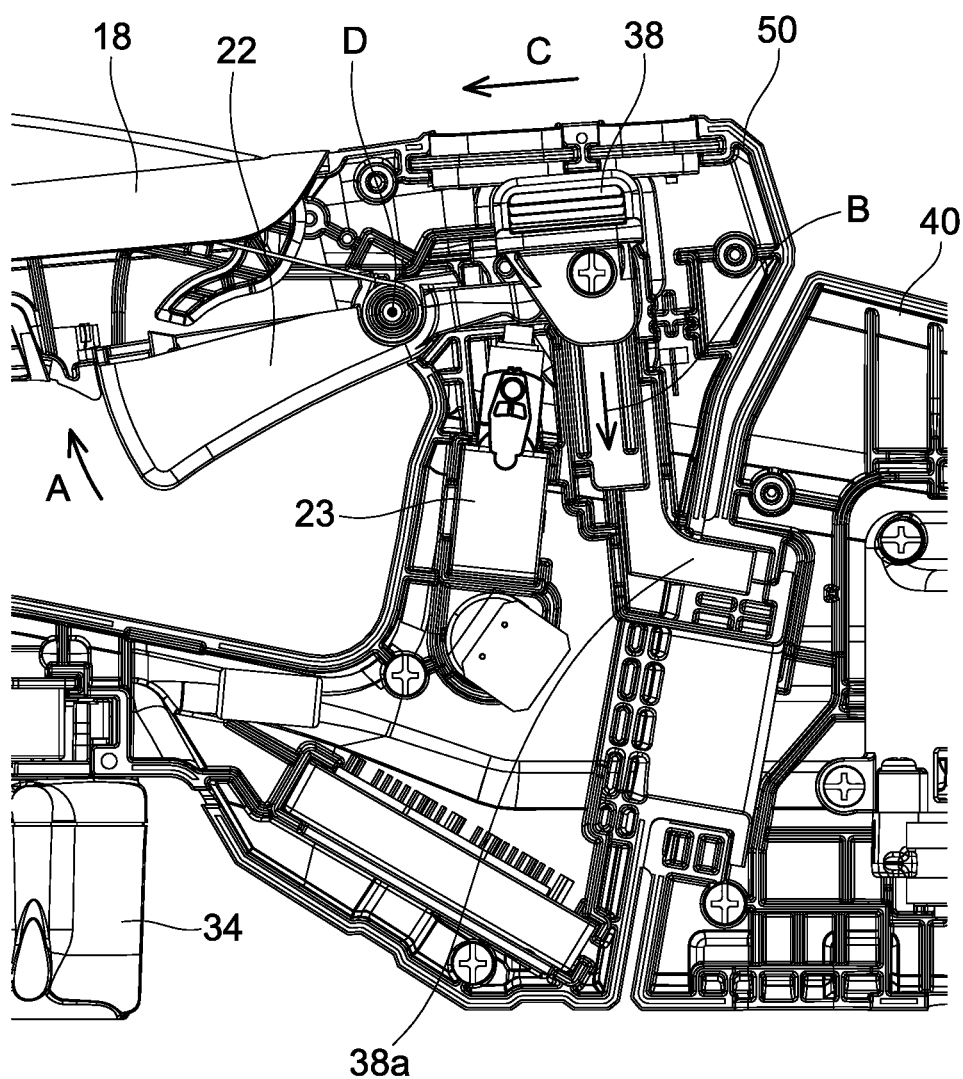
FIG. 4 is an enlarged view of an interlock mechanism including an interlock member 60.
Figure 5:
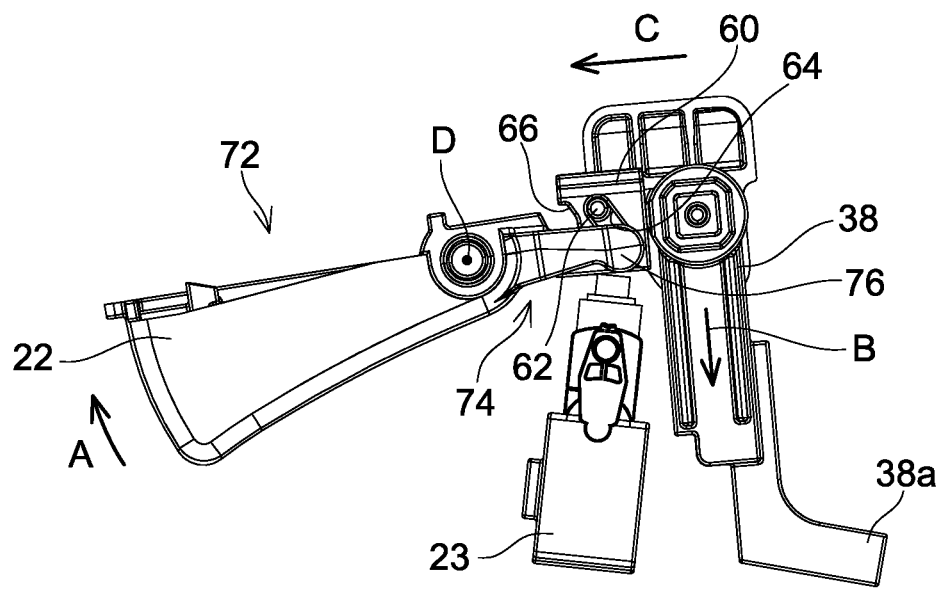
FIG. 5 shows one side of the interlock mechanism including the interlock member 60.
Figure 6:
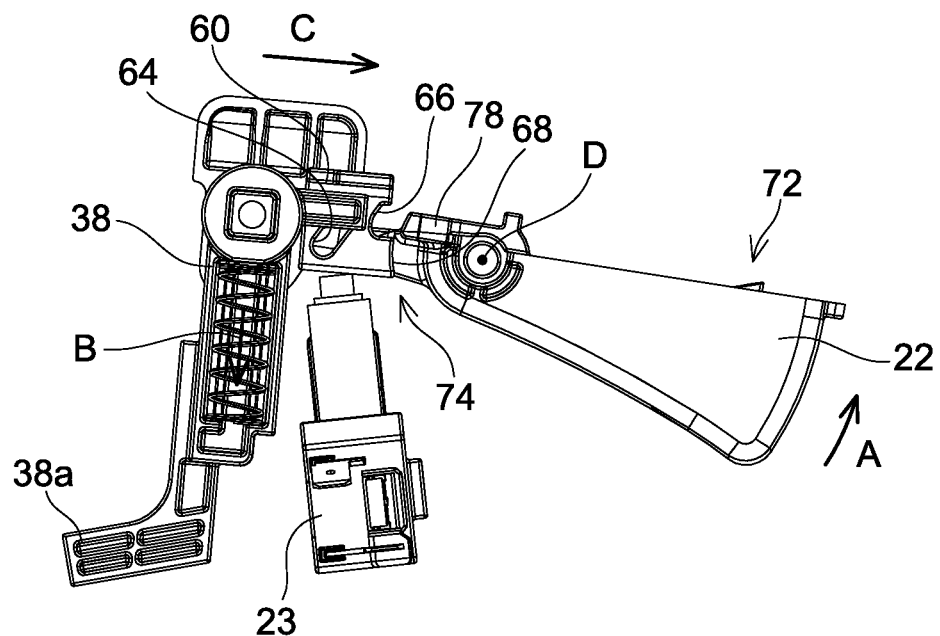
FIG. 6 shows another side of the interlock mechanism including the interlock member 60.

As shown in FIGS. 4 to 6, the hedge trimmer 10 of the embodiment further comprises an interlock member 60. The interlock member 60 constitutes an interlock mechanism configured to prohibit the drive manipulation member 22 and the lock manipulation member 38 from being manipulated simultaneously. Hereinbelow, in addition to detailed configurations of the drive manipulation member 22 and the lock manipulation member 38, configurations of the interlock member 60 and the interlock mechanism will be described.

The drive manipulation member 22 is provided on the second housing 50 and is configured to be manipulated by the user between a stop position and a drive position. The pair of shear blades 14 is not allowed to be driven when the drive manipulation member 22 is at the stop position, whereas the pair of shear blades 14 is allowed to be driven when the drive manipulation member 22 is at the drive position. In FIGS. 4 to 6, the drive manipulation member 22 is at the stop position, and it moves to the drive position when manipulated in a direction A in the drawings. As described above, the drive manipulation member 22 operates the switching unit 23 within the second housing 50 when manipulated by the user.

The lock manipulation member 38 is provided on the second housing 50 and is configured to be manipulated by the user between a lock position and an unlock position. When the lock manipulation member 38 is at the lock position, a lock portion 38a of the lock manipulation member 38 is engaged with the first housing 40, by which the rotation of the second housing 50 with respect to the first housing 40 is prohibited. When the lock manipulation member 38 is at the unlock position, the engagement of the lock portion 38a is released, by which the rotation of the second housing 50 with respect to the first housing 40 is allowed. In FIGS. 4 to 6, the lock manipulation member 38 is at the lock position, and it moves to the unlock position when manipulated in a direction B in the drawings.

The interlock member 60 is provided on the second housing 50. The interlock member 60 is coupled to the lock manipulation member 38, is configured to move to a first position when the lock manipulation member 38 moves to the lock position, and is configured to move to a second position when the lock manipulation member 38 moves to the unlock position. In FIGS. 4 to 6, the interlock member 60 is at the first position, and it moves to the second position along a direction C in the drawings when the lock manipulation member 38 is manipulated in the direction B. The lock manipulation member 38 is provided with an engagement pin 62, the interlock member 60 is provided with an engagement hole 64, and the engagement pin 62 is disposed in the engagement hole 64, although this is merely an example. The engagement hole 64 is a long hole extending in a direction that is angled to both the directions A and B, and the interlock member 60 is thereby configured to coordinate with the lock manipulation member 38.

As shown in FIGS. 4 to 7, the drive manipulation member 22 is supported rotatably about an axis D with respect to the second housing 50. The drive manipulation member 22 comprises a first portion 72 extending from the axis D in one direction and a second portion 74 extending from the axis D in another direction. The first portion 72 is exposed to outside of the second housing 50 and is configured to be manipulated by the user. The second portion 74 is located inside the second housing 50, and comprises a switch operation portion 76 and an interlock engaging portion 78. The switch operation portion 76 has a switch operation surface 76a that is in contact with the switching unit 23 and is configured to operate the switching unit 23 by rotation of the drive manipulation member 22. The switch operation portion 76 has a top portion 76b that includes the switch operation surface 76a, and a side surface 76c extending from the top portion 76b towards the axis D and on an opposite side of the second portion 74 from the switch operation surface 76a. The switch operation portion 76 is located relatively apart from the axis D, and thus it moves to a relatively large degree as the drive manipulation member 22 rotates. Due to this, the switch operation portion 76 can operate the switching unit 23 to a large degree.

Figure 7:
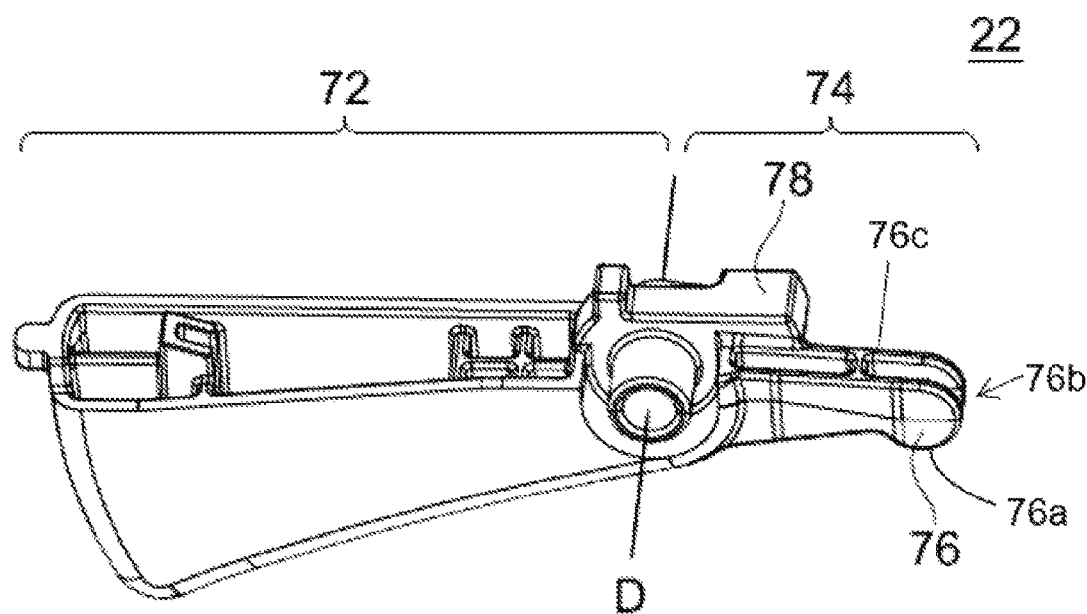
FIG. 7 shows a drive manipulation member 22 alone.

The interlock engaging portion 78 is configured to engage with or contact with the interlock member 60 in accordance with positions of the drive manipulation member 22 and the lock manipulation member 38. As shown in FIGS. 6 and 7, the interlock engaging portion 78 has a projection shape projecting from the side surface 76c in a direction parallel with the axis D, and the interlock member 60 is provided with a recess 66 corresponding to the shape of the interlock engaging portion 78. When the lock manipulation member 38 is at the lock position and the interlock member 60 is at the first position, the interlock engaging portion 78 is separated from the interlock member 60. Therefore, the drive manipulation member 22 can freely rotate in accordance with user's manipulation. Contrary to this, when the lock manipulation member 38 is manipulated to move to the unlock position and the interlock member 60 moves along the direction C to the second position, the interlock engaging portion 78 engages with the recess 66 of the interlock member 60. Therefore, the drive manipulation member 22 is prohibited from rotating to the drive position.

On the other hand, a situation is assumed where the drive manipulation member 22 is manipulated to move to the drive position when the lock manipulation member 38 is at the lock position. In this case, the interlock engaging portion 78 of the drive manipulation member 22 moves downward in FIG. 6. The interlock engaging portion 78 that has moved downward faces a contact surface 68 of the interlock member 60. Due to this, the interlock member 60 is prohibited from moving to the second position along the direction C. Therefore, while the drive manipulation member 22 is manipulated to be at the drive position, the lock manipulation member 38 is prohibited from being manipulated to move to the unlock position. The interlock engaging portion 78 is located relatively near the axis D. Due to this, the interlock member 60 is also located near the axis D, and a distance between the drive manipulation member 22 and the lock manipulation member 38 is designed to be shor.

The switch operation portion 76 and the interlock engaging portion 78 are located at different positions from each other in a direction parallel to the axis D. According to such a configuration, the second portion 74 of the drive manipulation member 22 can be made relatively small, by which the interlock mechanism including the interlock member 60 can be downsized. Downsizing of the interlock mechanism can achieve downsizing of the hedge trimmer 10.

In the present embodiment, a distance from the axis D of the drive manipulation member 22 to the interlock engaging portion 78 is shorter than a distance from the same axis D to the switch operation portion 76. According to such a configuration, the interlock mechanism including the interlock member 60 can be downsized while the distance from the axis D of the drive manipulation member 22 to the switch operation portion 76 is made large. When the distance from the axis D of the drive manipulation member 22 to the switch operation portion 76 is large, the switch operation portion 76 moves to relatively large degree as the drive manipulation member 22 rotates. Due to this, the operation amount of the switching unit 23 by the switch operation portion 76 can be made large.

In the present embodiment, the interlock member 60 is arranged side by side with the switch operation portion 76 of the drive manipulation member 22 in the direction parallel to the axis D of the drive manipulation member 22. According to such a configuration, the interlock member 60 is arranged near the axis D of the drive manipulation member 22, and thus the distance between the drive manipulation member 22 and the lock manipulation member 38 can be made short. Due to this, the electric power tool, such as the hedge trimmer 10, can further be downsized.

The interlock member 60 of the present embodiment becomes close to the drive manipulation member 22 by moving to the second position (i.e., by moving in the direction C) and becomes apart from the drive manipulation member 22 by moving to the first position. However, no particular limitation is placed on how the interlock member 60 moves (e.g., its moving direction and moving amount), and it can be designed variously.

Although the hedge trimmer 10 of the embodiment has been described, the interlock mechanism which has been described in the embodiment can be employed not only in the hedge trimmer 10 but also in other various handheld-type electric power tools.

What is claimed is:

1. An electric power tool comprising:
a first housing configured to be attached to a tool;
an electric motor configured to be physically connected to the tool attached to the first housing;
a second housing rotatably connected to the first housing and comprising a handle configured to be gripped by a user;
a drive manipulation member provided on the second housing, supported at a stop position and configured to be manipulated by the user from the stop position in a first direction, wherein the tool is not allowed to be driven when the drive manipulation member is at the stop position, and the tool is allowed to be driven when the drive manipulation member is manipulated from the stop position in the first direction;
a switching unit configured to be operated by the drive manipulation member within the second housing and configured to control electric power supplied to the motor in accordance with an operation applied to the switching unit;

a lock manipulation member provided on the second housing, supported at a lock position and configured to be manipulated by the user from the lock position in a second direction, wherein rotation of the second housing with respect to the first housing is prohibited when the lock manipulation member is at the lock position, and the rotation of the second housing with respect to the first housing is allowed when the lock manipulation member is manipulated from the lock position in the second direction; and an interlock member coupled to the lock manipulation member, configured to be at a first position when the lock manipulation member is at the lock position and configured to move position in a third direction when the lock manipulation member moves from the lock position in the second direction, wherein the drive manipulation member is configured to be allowed to move from the stop position in the first direction when the interlock member is at the first position and configured to be prohibited from moving from the stop position in the first direction when the interlock member is not at the first position, the interlock member is configured to be allowed to move from the first position in the third direction when the drive manipulation member is at the stop position and configured to be prohibited from moving from the first position in the third direction when the drive manipulation member is not at the stop position, the drive manipulation member is supported rotatably about an axis with respect to the second housing, and comprises a first portion extending from the axis in one direction and a second portion extending from the axis in another direction, the first portion is exposed to outside of the second housing and configured to be manipulated by the user, the second portion comprises a switch operation surface configured to be in contact with the switching unit to operate the switching unit, a tip portion including the switch operation surface, a side surface extending from the top portion towards the axis and on an opposite side of the second portion from the switch operation surface, and an interlock engaging portion projecting from the side surface in a direction parallel with the axis and configured to engage with or contact with the interlock member, and the switch operation surface and the interlock engaging portion are located at different positions from each other in the direction parallel to the axis.

2. The electric power tool according to claim 1, wherein a distance from the axis to the interlock engaging portion is shorter than a distance from the axis to the switch operation portion.

3. The electric power tool according to claim 1, wherein the interlock member is arranged side by side with the switch operation portion of the drive manipulation member in the direction parallel to the axis.

4. The electric power tool according to claim 1, wherein the third direction is perpendicular to the axis of the drive manipulation member, and the interlock member is configured to move towards the axis of the drive manipulation member when the interlock member moves from the first position in the third direction.

5. The electric power tool according to claim 1, wherein the second direction along which the lock manipulation member moves from the lock position is different from the third direction along which the interlock member moves from the first position.

6. The electric power tool according to claim 1, wherein the lock manipulation member is located between the handle and the first housing.

7. The electric power tool according to claim 1, wherein the tool is a pair of shear blades.

8. The electric power tool according to claim 1, wherein a distance from the axis to the interlock engaging portion is shorter than a distance from the axis to the switch operation surface.

9. An electric power tool comprising:

a first housing configured to be attached to a tool;

a second housing rotatably connected to the first housing;

an electric motor configured to be physically connected to the tool attached to the first housing;

a drive manipulation member supported rotatably about an axis with respect to the second housing, wherein the drive manipulation member is supported at a stop position and configured to be manipulated by the user from the stop position in a first direction, the drive manipulation member comprises a switch operation surface, a tip portion including the switch operation surface, a side surface extending from the top portion towards the axis and on an opposite side of the second portion from the switch operation surface, and an interlock engaging portion projecting from the side surface along a direction parallel with the axis, and the switch operation surface and the interlock engaging portion are located at different positions from each other in the direction parallel to the axis;

a switching unit located within the second housing, wherein the switching unit is configured to be in contact with the switch operation surface of the drive manipulation member so as to be operated by the drive manipulation member when the drive manipulation member is manipulated from the stop position in the first direction, and the switching unit is further configured to control electric power supplied to the motor in accordance with operation applied to the switching unit;

a lock manipulation member located at a lock position on the second housing, wherein the lock manipulation member is configured to be manipulated by the user from the lock position in a second direction, the lock manipulation member is further configured to allow the second housing to rotate with respect to the first housing when the lock manipulation member is moved from the lock position in the second direction; and an interlock member coupled to the lock manipulation member, wherein the interlock member is supported at a first position and configured to move from the first position in a third direction when the lock manipulation member is manipulated from the lock position in the second direction and the interlock member is further configured to prohibit the drive manipulation member from moving from the stop position in the first direction by engaging with or contacting with the interlock engaging portion of the drive manipulation member when the interlock member is not at the first position.

10. The electric power tool according to claim 9, wherein the drive manipulation member comprises a first portion extending from the axis in one direction and a second portion extending from the axis in another direction, the first portion of the drive manipulation member is exposed to outside of the second housing and configured to be manipulated by the user, and the switch operation portion and the interlock engaging portion are located in the second portion of the drive manipulation member side-by-side in the direction parallel to the axis.

11. The electric power tool according to claim 9, wherein the interlock engaging portion of the drive manipulation member is configured to prohibit the interlock member from moving from the first position in the third direction by engaging with or contacting with the interlock member when the drive manipulation member is not at the stop position.

12. The electric power tool according to claim 9, wherein a distance from the axis to the interlock engaging portion is shorter than a distance from the axis to the switch operation surface.

* * * * *